United States Patent

Gray

(10) Patent No.: US 8,167,997 B2
(45) Date of Patent: May 1, 2012

(54) CONCRETE MIXTURES HAVING STABILIZED FOAM ADMIXTURE

(75) Inventor: Lonnie James Gray, Murray, UT (US)

(73) Assignee: Jack B. Parson Companies, Salt Lake City, UT (US)

( * ) Notice: Subject to any disclaimer, the term of this patent is extended or adjusted under 35 U.S.C. 154(b) by 242 days.

(21) Appl. No.: 12/701,398

(22) Filed: Feb. 5, 2010

(65) Prior Publication Data

US 2010/0139523 A1 Jun. 10, 2010

Related U.S. Application Data

(63) Continuation-in-part of application No. 11/311,490, filed on Dec. 19, 2005, now Pat. No. 7,670,426.

(60) Provisional application No. 60/715,458, filed on Sep. 9, 2005.

(51) Int. Cl.
C04B 24/12 (2006.01)
C04B 22/16 (2006.01)

(52) U.S. Cl. ......... 106/724; 106/726; 106/727; 106/823

(58) Field of Classification Search .................. 106/724, 106/726, 727, 823

See application file for complete search history.

(56) References Cited

U.S. PATENT DOCUMENTS

| | | | |
|---|---|---|---|
| 4,020,903 A | 5/1977 | Fielding et al. |
| 4,057,608 A | 11/1977 | Hashimoto et al. |
| 4,077,809 A | 3/1978 | Plunguian et al. |
| 4,089,804 A | 5/1978 | Falk |
| 4,171,282 A | 10/1979 | Mueller |
| 4,210,457 A | 7/1980 | Dodson et al. |
| 4,387,032 A | 6/1983 | Chiesa, Jr. |
| 4,420,434 A | 12/1983 | Falk |
| 4,460,480 A | 7/1984 | Kleiner et al. |
| 4,472,286 A | 9/1984 | Falk |
| 4,683,003 A | 7/1987 | Nakano et al. |
| 4,717,744 A | 1/1988 | Boutevin et al. |
| 4,859,349 A | 8/1989 | Clark et al. |
| 4,964,917 A | 10/1990 | Bobrowski et al. |
| 5,160,540 A | 11/1992 | Johansson et al. |
| 5,203,919 A | 4/1993 | Bobrowski et al. |
| 5,215,585 A | 6/1993 | Luthra et al. |
| 5,218,021 A | 6/1993 | Clark et al. |
| 5,250,578 A | 10/1993 | Cornwell |
| 5,413,819 A | 5/1995 | Drs |
| 5,417,759 A | 5/1995 | Huddleston |
| 5,427,617 A | 6/1995 | Bobrowski et al. |
| 5,496,475 A | 3/1996 | Jho et al. |
| 5,846,313 A | 12/1998 | Chuang |
| 5,919,300 A | 7/1999 | Burge et al. |
| 6,042,259 A | 3/2000 | Hines et al. |
| 6,139,775 A | 10/2000 | Thames |
| 6,153,005 A | 11/2000 | Welker et al. |
| 6,461,424 B1 | 10/2002 | Ramme et al. |
| 6,548,589 B2 | 4/2003 | Widmer et al. |
| 6,740,250 B2 | 5/2004 | Greiner et al. |
| 6,858,074 B2 | 2/2005 | Anderson et al. |
| 6,875,266 B1 | 4/2005 | Naji et al. |
| 7,005,082 B2 | 2/2006 | Clark |
| 7,011,763 B2 | 3/2006 | Clark |
| 7,044,170 B2 | 5/2006 | Goodwin |
| 7,172,709 B2 | 2/2007 | Clark |
| 7,621,995 B2 * | 11/2009 | Gray ........................ 106/724 |
| 7,670,426 B2 * | 3/2010 | Gray ........................ 106/724 |
| 2007/0056479 A1 | 3/2007 | Gray |
| 2007/0056480 A1 | 3/2007 | Gray |
| 2007/0056481 A1 | 3/2007 | Gray |

FOREIGN PATENT DOCUMENTS

JP 404163105 6/1992

OTHER PUBLICATIONS

Standard Specification for Coal Fly Ash and Raw or Calcined Natural Pozzolan for Use in Concrete, ASTM International, Designation: C 618-03.
U.S. Appl. No. 11/311,490, filed Oct. 13, 2009, Notice of Allowance.
U.S. Appl. No. 11/311,490, filed Jul. 28, 2009, Office Action.
U.S. Appl. No. 11/311,490, filed Feb. 2, 2009, Office Action.
U.S. Appl. No. 11/305,960, filed Dec. 31, 2008, Office Action.
U.S. Appl. No. 11/305,960, filed Jul. 29, 2009, Notice of Allowance.
U.S. Appl. No. 11/305,959, filed Jan. 9, 2009, Office Action.

* cited by examiner

*Primary Examiner* — Paul Marcantoni
(74) *Attorney, Agent, or Firm* — Workman Nydegger

(57) ABSTRACT

Flowable concrete mixtures have an aqueous foam admixture mixed therein to give the concrete mixture desired strength, flowability, and density. The concrete mixtures include a hydration stabilizer to stabilize the aqueous foam. The hydration stabilizer inhibits the reaction between the hydraulic cement and the water in the aqueous foam. The aqueous foam can be stabilized using a fluorochemical surfactant.

20 Claims, No Drawings

CONCRETE MIXTURES HAVING STABILIZED FOAM ADMIXTURE

CROSS-REFERENCE TO RELATED APPLICATIONS

This application is a Continuation-In-Part of U.S. patent application Ser. No. 11/311,490, filed Dec. 19, 2005, entitled "Concrete Mixtures Having Aqueous Foam Admixtures" which claims the benefit of U.S. Provisional Patent Application Ser. No. 60/715,458, filed Sep. 9, 2005, entitled "Concrete Mixtures Having Aqueous Foam Admixtures," the disclosure of which is incorporated herein in its entirety.

BACKGROUND OF THE INVENTION

1. The Field of the Invention

The present invention relates to flowable concrete mixtures and cured concrete obtained therefrom. More particularly, the present invention relates to concrete mixtures that have an aqueous based foam admixture and a hydration stabilizer that stabilizes the foam in the concrete.

2. Related Technology

Concrete mixtures are composite materials that are usually composed of water, cement, and aggregate. Common aggregates include sand, gravel, or crushed stone. Concrete is a well-known structural component with typical compressive strengths of about 2500 psi, when cured.

Admixtures are often added to concrete to give the concrete desired properties. Examples of suitable uses for concrete admixtures include lowering the concrete's density, improving the concrete's workability, improving the concrete's strength to weight ratio, giving the concrete insulating properties, and/or enhancing the acoustic properties of the concrete, among others. These beneficial properties are often accomplished by adding several different admixtures.

Air entraining agents are often used alone or in combination with other admixtures to give the concrete one or more of the foregoing properties. Air entraining admixtures are used to purposely trap microscopic air bubbles in the concrete. Air entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding.

There are several methods for entraining air in concrete. One approach is to generate bubbles or air pockets in situ. This approach can be accomplished using surfactants or other air entraining admixtures that generate bubbles as the concrete is mixed. Materials used to achieve these desired effects include non-ionic, cationic, and anionic surfactants, natural and synthetic resins, fatty acids, proteinaceous material, sulfonated hydrocarbons, and the like. This approach, while effective for entraining small amounts of air, is difficult to use for higher percentages of air because the bubble size, amount of bubbles, durability, and distribution of bubbles within the concrete are difficult to control.

Another approach for incorporating air in concrete is to add foam admixtures. When using a foam admixture, the cellular bubbles (i.e. the foam) is formed ex-situ and then mixed with the concrete. This method is advantageous because the foam is created in a controlled environment. The water, air, and foaming concentrates can be designed to produce foams having a desired size and composition.

Despite many advantages, the use of foam admixtures formed ex-situ have had limited use (e.g. in insulating, non-structural, or non-load-bearing bearing applications). Most commercially available foaming agents are not stable in cementitious media and the results of their use are often inconsistent. For example, with existing foam-concrete mixtures, the size and distribution of foam cells have been difficult to control and the cells have had a limited period of usefulness or lifetime. The foam cells have tended to agglomerate, coalesce, and recombine to give larger cells and a wide range of sizes. Long mixing times, such as those required for transportation from a concrete production facility to a construction site, have been precluded due to bubbles collapsing and air escaping from the mix. Even when additives have been used to stabilize these foams (e.g., U.S. Pat. Nos. 5,160,540 and 6,153,005, which are hereby incorporated by reference), the foam's stability and useful lifetime in the concrete prevents use in many applications, such as those requiring transportation of the concrete (e.g. ready mixed concrete).

BRIEF SUMMARY OF THE INVENTION

The present invention relates to flowable concrete mixtures comprising an aqueous foam. The concrete mixtures include (i) a hydraulic cement, (ii) a hydration stabilizer, and (iii) an aqueous foam. The hydration stabilizer inhibits hydration of the hydraulic cement thereby inhibiting deleterious interactions between the cement and the aqueous foam that can destroy the foam bubbles. The stabilizing effect of the hydration stabilizer allows the foam to be successfully combined with concrete mixtures and/or allows the foam to last longer in the concrete mixture.

The hydration stabilizers used to reduce the reaction between the cement and the foam includes a hydration retarder that can slow or stop hydration of the siliceous and/or aluminous component of hydraulic cements. Preferred hydration stabilizers are those that can bind calcium, such as derivatives of phosphonic acid and carboxylic acids having hydroxyl or amino groups. Because of the retarding effect that the hydration retarder can have on setting, the hydration stabilizer may also include an accelerator.

The inventor of the present invention has found that controlling the hydration of the cement has a significant stabilizing effect on aqueous based foams in concrete mixtures. The hydration stabilization of the present invention allows aqueous foams to be added to concrete that would otherwise not be stable in a concrete mixture. Furthermore, aqueous foams that are currently being used in concrete mixtures for certain applications (i.e. to make some precast structures) can be sufficiently stabilized such that they can be used in new applications that require longer initial set times (e.g. ready mix applications).

In a preferred embodiment, the present invention is used with foams that have a fluorochemical surfactant. Fluorochemical surfactants are known to stabilize and/or strengthen the air bubbles in aqueous foams. Fluorochemical surfactants have been used in firefighting foams to generate foam bubbles that have enough structural stability that they can be sprayed on a burning chemical and last long enough to smother the fire. The aqueous nature of these foams and the stability of the foam bubbles make these foams particularly useful in the concrete mixtures of the present invention. The use of at least one such foam in a concrete mixture is described in U.S. Pat. No. 6,153,005 to Welker et al., which is incorporated herein by reference.

The stabilizing effect of the fluorochemical surfactant is distinct and in addition to the stabilizing effect of the hydration stabilizer. The fluorochemical surfactant is a component of the foam bubble and provides stability within the bubble. In contrast, the hydration stabilizer is a component of the concrete mixture to prevent deleterious interactions between the cement and the aqueous foam.

Foams stabilized with fluorochemical surfactants are particularly benefited by the hydration stabilizers used in the concrete mixture of the present invention. Since fluorochemical stabilized foams have bubbles that are already particularly stable, it is believed to be the interactions between the cement and the foam that has previously prevented the use of these foams in concrete and/or has previously prevented their use in applications that require relatively long initial set times (e.g. ready mix applications). In the present invention the hydraulic cement is stabilized with respect to the aqueous foam, thereby allowing or improving their use in the concrete mix. The resulting concrete compositions have many improved properties, including decreased permeability, decreased shrinkage, decreased absorption and bleeding, improved acoustic properties, lower densities, and increased initial flowability. The concrete mixtures also have reduced water migration, which improves the hydration of cement and can improve the reaction between free lime and pozzolans. The concrete mixtures also have improved aesthetics due to reduced rock pockets.

The hydration stabilizer used in the present invention is also particularly advantageous when used with foams stabilized with fluorochemical oligomers comprising hydrophilic nonionic monomers and hydrophilic anionic monomers. Foams stabilized using these surfactants provide additional benefits because of the interaction between the oligomer in the foam and certain components of the concrete mixture (e.g. the cement and/or the aggregate). It is believed that the nonionic and anionic monomers are able to better disperse the cement particles and/or the aggregates uniformly in the concrete mixture. This dispersion of components in the mixtures of the present invention is believed to be the source of the added workability of these mixtures and the strength of the cured concrete resulting therefrom.

These and other features of the present invention will become more fully apparent from the following description and appended claims.

DETAILED DESCRIPTION OF THE PREFERRED EMBODIMENTS

I. Introduction

The present invention relates to flowable concrete mixtures having aqueous foam admixtures. The concrete mixtures of the present invention include (i) a hydraulic cement, (ii) a hydration stabilizer, and (iii) an aqueous foam. The hydration stabilizer controls hydration of the cement to inhibit the reaction between the cement and the aqueous foam, thereby preserving the foam bubbles for a desired amount of time.

For purposes of the present invention, the "initial set time" occurs when the concrete reaches a compressive strength of 500 psi.

For purposes of the present invention, the term "air" includes all gases including mixtures of gases and pure gasses, whether obtained from the atmosphere or generated by chemical reaction.

II. Concrete Mixtures

The concrete mixtures of the present invention can have very different compositions depending on the desired use for the concrete. However, in general, the concrete mixtures of the present invention include at least hydraulic cement, a hydration stabilizer, an aqueous foam admixture, and water (either from the foam or added separately). The concrete mixtures typically include an aggregate, which gives the concrete strength. Dispersants and other admixtures are also described below and can be included to give the concrete mixtures of the present invention desired properties.

A. Hydraulic Cement and Water

The cement included in the concrete mixtures of the present invention is a hydraulic material such as Portland cement, modified Portland cement, or masonry cement. For purposes of this invention, Portland cement includes all cementitious compositions which have a high content of tricalcium silicate, including Portland cement, cements that are chemically similar or analogous to Portland cement, and cements that fall within ASTM specification C-150-00. Other cementitious materials include ground granulated blast-furnace slag, hydraulic hydrated lime, white cement, slag cement, calcium aluminate cement, silicate cement, phosphate cement, high-alumina cement, magnesium oxychloride cement, and combinations of these and other similar materials.

Water is added to the concrete mixture in sufficient amounts to hydrate the cement. Those skilled in the art will recognize that the amount of water needed will depend on the desired flowability and on the amounts and types of admixtures included in the concrete composition. Many of these admixtures are discussed below. In general, suitable amounts of water for hydrating the cement ranges from about 1% to about 50%, more preferably about 5-50%, and most preferably about 10% to about 25% of the concrete mixture by weight.

B. Foam Admixtures

The foams used in the concrete mixtures of the present invention include water, air, and at least one foaming agent (e.g. surfactant). The foam admixtures comprise a plurality of cellular bubbles that trap air in the concrete and provide the uncured concrete with desired properties such as flowability and/or workability and provide the cured concrete with properties such as increased strength and/or resistance to cracking during freeze thaw cycles.

The foams of the present invention can be made from a foaming concentrate. A detailed description of how to make the aqueous foam admixture using a foaming concentrate, air, and water is described below in connection with the methods of the present invention and the examples.

The composition of the foaming concentrate is in large part responsible for the properties of the foam admixture. The following is a description of suitable foaming concentrate composition. The foaming concentrates typically include a foaming agent, solvents, and other surfactants, and/or additives that allow the foaming concentrate to form foam bubbles that can be added to concrete.

1. Foaming Concentrates (a) Foaming Agents and Solvents

The foaming concentrates include at least one foaming agent suitable for forming an aqueous based foam. Typical foaming agents include ionic, cationic, anionic surfactants, natural and synthetic resins, fatty acids, proteinaceous material, sulfonated hydrocarbons, and the like. In an exemplary embodiment, the foaming concentrate comprises a combination of foaming agents, solvents and/or viscosity modifiers or other components. In a preferred embodiment, the foaming agents can be a non-fluorinated anionic surfactant preferably selected from the group consisting of $C_8$ to $C_{18}$ anionic surfactants and most preferably, $C_{10}$ to $C_{18}$ alpha olefin sulfonates, as well as mixtures of these surfactants.

Suitable solvents include glycol ethers and fatty alcohols of about 8 to about 15 carbons or $C_2$ to $C_8$ aliphatic diols. Specifically preferred as the solvent, if used, is propylene glycol t-butyl ether. The preferred fatty alcohol comprises a mixture of equal parts n-dodecanol, n-tetra decanol and n-hexadecanol. Preferred as the anionic surfactant are mixtures of sodium alkenyl sulfonate, sodium tetradecene sulfonate, and sodium hexadecene sulfonate in a ratio of about 4:1:1.

Viscosity modifiers can also be added to the foam admixture. Suitable viscosity modifiers include those described below as admixtures to be added to the concrete mixture apart from the foam. Preferred viscosity modifiers include polysaccharide gums, preferably selected from the group consisting of rhamsan gums, xanthan gums, guar gums and locust bean gums. Viscosity modifiers such as polysaccharide gums can be useful in foams because they form a membrane on the surface of solvents that protects the rest of the foam from collapsing. The viscosity modifier in the foam can also aid in pumpability of the concrete mixture.

Other ingredients can be employed in the composition of the surfactant formulation to effect specific environmental or shelf-life concerns. Examples of such ingredients are freezing point depressants, such as ethylene glycol, and preservatives, such as that available under the trade name DOWICIDE (Dow Chemical Company).

There are many other known foaming concentrates that can be used with the present invention. Suitable foaming surfactant concentrates include cellulose based concentrates (e.g. "CELLUCON" (Romaroda Chemicals)) and hydrolyzed protein based concentrates (e.g. MEARL (The Mearl Corporation)).

The foam concentrates include surfactants and additives that lead to foams with sufficient mechanical stability to withstand the mixing involved in making concrete compositions. The foregoing concentrates, if needed, can be structurally strengthened (i.e. stabilized) using a fluorochemical surfactant as described below, or other similar stabilizing additive.

(b) Foam Stabilizing Surfactants

In an exemplary embodiment the foam concentrate includes a fluorochemical foam stabilizing surfactant. Fluorochemical foam stabilizing surfactants are well known in the art of fire fighting foams (e.g. U.S. Pat. Nos. 5,218,021, 4,472,286; 4,717,744; and 4,859,349; 4,460,480; 4,387,032; and 4,020,903; which are incorporated herein by reference). Particularly useful fluorinated surfactants are oligomer surfactants that includes (i) a fluorinated hydrocarbon monomer, (ii) a hydrophilic nonionic monomer, and (iii) a hydrophilic anionic monomer.

Examples of suitable fluorinated hydrocarbon monomer include (i) straight chain, branched chain, or cyclic perfluoroalkyls of 1 to about 20 carbon atoms, (ii) perfluoroalkyls substituted with perfluoroalkoxy groups of 2 to about 20 carbon atoms, (iii) a perfluoroalkyl oligomers or polymers of greater than 10 carbon atoms, or (iv) monomers of the like and/or combination thereof.

Many non-ionic hydrophilic monomers suitable for use in the present invention are known and commercially available. Particularly useful non-ionic hydrophilic monomers include acrylamide, methacrylamide, diacetone acrylamide, and 2-hydroxyethyl methacrylate. Other examples of such monomers include derivatives of acrylic, methacrylic, maleic, fumaric, and itaconic acids, such as hydroxyalkyl esters of acrylic acids; amides such as N-vinyl-pyrrolidone, N-(hydroxyalkyl)-acrylamides, or N-(hydroxyalkyl)-methacrylamides; and vinyl esters with 1-20 carbons in the ester group such as vinyl acetate, butyrate, laurate, or stearate. The above listed non-ionic hydrophilic monomers can be used alone or in combination with each other as well as in combination with suitable anionic hydrophilic monomers described below. Some non-ionic hydrophilic monomers may require a co-monomer for polymerization, such as di(hydroxyalkyl) maleates with ethoxylated hydroxyalkyl maleates.

Many anionic hydrophilic monomers that co-oligomerize with non-ionic hydrophilic monomers are known and are commercially available. Particularly useful anionic hydrophilic monomers include acrylic and methacrylic acids and salts thereof. Other examples of such monomers include maleic, fumaric, and itaconic acids and salts thereof; acrylamidopropane sulfonic acid and salts thereof; and mono-olefinic sulfonic and phosphonic acids and salts thereof.

Oligomers made using the foregoing fluorinated hydrocarbon monomers and hydrophilic monomers are particularly advantageous when used with foams in the concrete mixtures of the present invention. These oligomers are particularly useful for dispersing and/or suspending the cement and/or aggregates in the concrete mixture. By dispersing and/or suspending these and other components of the concrete mixture, the resulting cured concrete has improved strength and resistance to cracking.

While the foams of the present invention preferably include a fluorochemical foam stabilizer, the present invention is not limited to these foams. The use of a hydration stabilizer with other aqueous based foams can advantageously stabilize and prolong the life of the foam in concrete.

(c) Example Foaming Concentrates

In one embodiment, the foaming concentrate is a firefighting foam concentrate suitable for extinguishing Class A fires or Class B fires. For purposes of this invention, firefighting foam concentrates are compositions that include the agents needed to extinguish a fire when applied thereto as specified by the Underwriter Laboratories specification 162. In one embodiment, the firefighting foam concentrate meets Class A, Class B, and/or Class D or other section of the UL162 specification in effect in 2006. The firefighting foam may include a fluorochemical surfactant or may substantially free of a fluorochemical surfactant. The concentrate may be an aqueous film forming foam (AFFF), a protein foam, a fluoroprotein foam (FP, or an alcohol resistant fluoroprotein foam (AR-FP, a film forming fluoroprotein (FFFP) or an alcohol-resistant film forming fluoroprotein (AR-FFFP) or wetting agent suitable for use in firefighting. An example of a suitable Class A fire-fighting foam concentrate is Pinnacle Class A Foam Concentrate available from Hazard Control Technologies, Inc. (Fayetteville, Ga.). Examples of firefighting concentrates include, but are not limited to those described in U.S. Pat. Nos. 7,172,709; 7,005,082; 7,011,763; 6,139,775; and 6,740,250, all of which are hereby incorporated herein by reference for their teachings of firefighting concentrates.

Table 1 below sets forth exemplary foaming concentrates according to the present invention. In Table 1, column 1 specifies the useful ranges for each component, column 2 specifies preferred ranges for each of the components and column 3 describes the highly preferred ranges for each of the components. In Table 1, all compositions are in parts by weight. The fluorochemical surfactant is normally supplied as a solution in an alcohol such as tert-butyl alcohol.

TABLE 1

|  | 1 | 2 | 3 |
|---|---|---|---|
| Solvent | 0-50% | 0-20% | 1-10% |
| Fatty Alcohol | 0.1-10% | 0.1-1.0% | 0.2-1.0% |
| Polysaccharide Gum | 0.1-10% | 0.1-5.0% | 0.5-4.0% |
| Anionic Surfactant | 0.1-50% | 0.1-20% | 0.5-8.0% |
| Fluorochemical | 0.1-15% | 0.1-5.0% | 0.5-3.0% |
| Water | Balance | Balance | Balance |

A particularly useful foaming concentrate that includes a fluorochemical surfactant is sold by Miracon Technologies, Inc. under the trademark Miracon®.

C. Hydration Stabilization

The hydration stabilizer (also known as an extended set retarder) of the present invention is used to inhibit the hydration of the hydraulic cement. The hydration stabilizer slows the rate of hydrate formation by tying up (i.e. chelating, complexing, or otherwise binding) calcium ions on the surface of cement particles. The hydration stabilizer includes a hydration retarder that forms a protective barrier around cementitious particles. The hydration retarder bonded to the cement particles acts as a dispersant preventing hydrates from flocculating and setting. This barrier prevents the hydraulic cement from obtaining initial set.

Another feature of the hydration stabilizer is that it degrades and/or is inactivated over time such that hydration of the cement eventually occurs. Preferably the release of the hydraulic cement is progressive over time so as to provide a controlled release of the cement and an ascertainable delay in set time.

The hydration stabilizer preferably comprises a calcium chelating compound such as a polyphosphonic acid or a carboxylic acid that contains hydroxyl and/or amino groups. Polyphosphonic acids and similar compounds can be particularly advantageous because of their controlled degradation in the concrete mixture over an extended period of time that allows for a timed setting of the concrete.

Suitable examples of hydration stabilizers include N-nitrilo tris(methylene phosphonic acid); 1,2-ethanediyl bis[nitrilo di(methylene phosphonic acid)]; 1,6-hexanediyl bis[nitrilo di(methylene phosphonic acid)] and the like.

Another class of suitable phosphonic acid hydration stabilizing compounds include polymethoxy polyphosphonic acids represented by the formula II

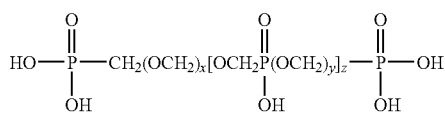

wherein x and y are each an integer of from 1-3, and preferably 1, and z is an integer of 0 or 1. It is understood that when z is 0 the radical within the bracket is non-existent and, therefore $(OCH_2)_y$ is nonexistent. The preferred polymethoxy polyphosphonic acid compounds are represented by the above formula when z=0 and x is 1-3. Other suitable polymethoxy polyphosphonic acid compounds are disclosed in U.S. Pat. No. 5,215,585, which is incorporated herein by reference.

A particularly useful hydration stabilizer is amino tris(m-ethylene phosphonic acid), which is a component of the commercially available hydration stabilizer sold by Master Builders under the trademark Delvo. Illustrative examples of hydration stabilizers, including some of those mentioned above, are set forth in U.S. Pat. Nos. 5,427,617 and 5,203,919, which are incorporated herein by reference. Hydration retarders and accelerators suitable for use as hydration stabilizers are also disclosed in U.S. Pat. No. 6,858,074, which is also incorporated herein by reference.

As mentioned, the hydration stabilizer of the present invention prevents or inhibits setting and then degrades or is released from the cement to provide controlled setting. In some cases, it is necessary that the hydration stabilizer also comprise an accelerator to cause the controlled hydration of the cement. The amount of accelerator that needs to be added depends on several factors, such as the amount of hydration retarder, cement type and reactivity, ambient temperature, concrete mixture proportions, and the presence or absence of certain admixtures in the concrete mixture, such as water reducing polymers.

Accelerators that can be used to activate the hydraulic cement can be selected from conventional cement accelerators such as those classified as ASTM C 494 Type C admixtures. These include alkali metal halides (calcium chloride and the like), alkali metal nitrites (calcium nitrite and the like), alkali metal nitrates (calcium nitrate and the like), alkali metal formates (calcium formate and the like), alkali metal thiocyanates (sodium thiocyanate and the like), triethanolamine and the like. The particular set accelerator to be used will depend on the known nature of the accelerators and side effects of the agent. For example, where metal corrosion is not a problem, calcium chloride might be chosen, while if corrosion is a problem, the nitrite or nitrate salts might be better used. The preferred accelerators are calcium nitrate and the like.

The accelerating agent should be added in amounts which effectively cause the combined cement mixture to set and provide conventional 28 day strength for such compositions (e.g. mortars of about 2000-4000 psi; concrete of about 2,500 to 10,000 psi). The amount, based on cement content, should be from about 0.5 to about 6 weight percent, preferably from about 1 to about 5 percent.

The hydration stabilizer is mixed with the cement mixtures in amounts effective to prevent the hydraulic cement from reacting with the aqueous foam for a desired period of time. The specific effective amount depends on the amount and type of cement and the desired amount of stabilization. Preferably, a sufficient amount of hydration stabilizer is included in the concrete mixture to stabilize substantially all of the cement. Suitable amounts typically require from about 1.5 oz to about 8.0 oz per hundred lbs of cement, more preferably about 3.0 oz to about 6 oz, for a concrete mix having a 28 day cure time. The stabilization can be extended by adding about 4 oz of hydration stabilizer per 100 lbs cement per hour of extension.

Hydration stabilizers are known and used in the concrete industry for waste water reclamation and for reusing concrete mixtures. Currently, hydration stabilizers are added to concrete waste water so that the truck or other mixing machinery does not have to be washed out after use or so that the remaining concrete can be used on another job. The hydration stabilizer prevents setting until the cement can be reused. The inventor of the present invention has found that the properties and concentrations of hydration retarders used in these known hydration stabilizing compositions are surprisingly advantageous for stabilizing foam admixtures according to the present invention. Commercially available hydration stabilizers, in addition to Delvo mentioned above, include Recover (W.R. Grace), Delayed Set (Fritz-Pak Corp.), Stop-Set and Stop-Set L (Axim Italcementi Group), and Polychem Renu (General Resource Technology).

D. Dispersants and/or Water-Reducers

Water reducers are used in concrete mixtures to lower the water content in the plastic concrete (i.e. uncured concrete) to increase its strength and to obtain higher slump without adding water. Water-reducers will generally reduce the required water content of a concrete mixture for a given slump and are useful for pumping concrete and in hot weather to offset the increased water demand. These admixtures disperse the cement particles in the concrete and make more efficient use of the hydraulic cement. This dispersion increases strength and/or allows the cement content to be reduced while maintaining the same strength. Water-reducers should meet the requirements for Type A in ASTM C 494 Specification.

Another class of water reducers includes mid-range water reducers. These water reducers have a greater ability to reduce the water content of the concrete and are often used because of their ability to improve the finishability of concrete flatwork. Mid-range water reducers should at least meet the requirements for Type A in ASTM C 494.

High range water-reducers (HRWR), also referred to as superplasticizers, are a special class of water-reducer. HRWRs reduce the water content of a given concrete mixture by about 12% to 30%. HRWRs are used to increase strength and reduce permeability of concrete by reducing the water content in the mixture or greatly increase the slump to produce "flowing" concrete without adding water. HRWRs are often used for high strength and high performance concrete mixture that contain higher contents of cementitious materials and mixtures containing silica fume. In a typical concrete mixture, adding a normal dosage of HRWRs to a concrete mixture with a slump of 3 to 4 inches (75 to 100 mm) will produce a concrete with a slump of about 8 inches (200 mm). Exemplary HRWRs that can be used in the present invention are covered by ASTM Specification C 494 and types F and G, and Types 1 and 2 in ASTM C 1017. Particularly advantageous dispersants include the HRWRS described in U.S. Pat. No. 6,858,074, which is incorporated herein by reference.

It is believed that water reducing dispersants may have a particularly beneficial effect on the concrete compositions of the present invention by working in conjunction with the hydration stabilizer to stabilize the foam admixtures of the present invention.

E. Aggregates

Aggregates are usually included in the concrete mixture to add bulk and to give the concrete strength. The aggregate can be a fine aggregate and/or a coarse aggregate. The fine aggregates are materials that pass through a Number 4 sieve (ASTM C125 and ASTM C33), such as silica sand. The coarse aggregate are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

Whether an aggregate needs to be added can depend on the desired use of the cured concrete and on the type of aqueous foam admixture that is used. Some aqueous foam admixtures of the present invention are sufficiently stabilized to function as a foam aggregate. For example, the air bubbles in aqueous foams that are stabilized with a fluorochemical surfactant can have sufficient strength to act as a foam aggregate. In particular, foams stabilized with fluorochemical surfactants that include hydrophilic nonionic and hydrophilic anionic monomers are particularly suited to act as foam aggregates. It is believed that the anionic and nonionic monomers are able to disperse the hydraulic cement around the foam bubbles thereby creating a cement matrix similar to the cement matrix that forms around aggregates.

The concrete mixtures of the present invention also include concrete mixtures that include traditional aggregates (i.e. coarse and fine aggregates) in combination with foam aggregates (e.g. aqueous foams stabilized with surfactants having nonionic and anionic monomers). Concrete mixtures of the present invention that incorporate a combination of foam aggregates with fine aggregates and/or coarse aggregates can be made to have superior compressive and flexural strength and/or can include ratios of aggregate sizes that are not possible with traditional concrete mixtures.

For example, ready mixed concrete used in flat work or foundation walls typically has a ratio of fine aggregates to coarse aggregates of 50:50. This ratio can be usually be modified to ratios from 60:40 to 40:60. Using the aqueous foams stabilized with a fluorochemical surfactant, the concrete mixtures of the present invention can be made using ratios of less than 40% of either fine aggregates or coarse aggregates while still maintaining ASTM standards for flexural and compressive strength. In an exemplary embodiment, the aggregate can comprise less than 40% fine aggregate, less than 30% fine aggregate, less than 20% fine aggregate or even substantially no fine aggregate. Alternatively, the aggregate can comprise less than 40% coarse aggregate, less than 30% coarse aggregate, less than 20% coarse aggregate, or even substantially no coarse aggregate. Even with these low percentages of coarse or fine aggregate, a compressive strength of greater than 2500 psi, more preferably greater than 3000 psi, or most preferably greater than 4000 psi can be achieved.

The use of only one size of aggregate is particularly beneficial in areas where both coarse and fine aggregates are not available or a particular size aggregate is in abundance. Also, the concrete mixtures of the present invention are particularly useful for incorporating certain aggregates sizes such as ⅜ inch gravel (i.e. pea gravel), that cannot be used in some concrete mixtures because it leads to lower quality concrete. With the concrete mixtures of the present invention, pea gravel can be used while still maintaining suitable compressive strength (e.g. 3000-4000 psi).

Thus, using the foam aggregates of the present invention, novel combinations of aggregates can be used to make concrete having suitable strength for ready mixed concrete and other applications.

F. Fly Ash

Fly ash is another admixture that can be included in the concrete mixtures of the present invention. ASTM C618 standard, which is incorporated herein by reference, recognizes two major classes of fly ashes for use in concrete—Class C and Class F. These two classes of fly ashes are derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal. The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically contain high calcium oxide content. Presence of high calcium oxide content makes Class C fly ashes possess cementitious properties leading to the formation of calcium silicate and calcium aluminate hydrates when mixed with water. The use of Class C fly ash can be particularly useful to replace a portion of the cement in the concrete. Class C fly ash and Portland cement can be blended in weight ratios of ash to cement of about 0/100 to 150/100, preferably 75/100 to 125/100. In some reactive powder blends the portland cement is about 40 to 80 wt % and fly ash 20 to 60 wt %.

Because fly ash is obtained from coal combustion or found naturally, fly ash can include a certain amount of carbon. The amount of carbon in fly ash is measured according loss of ignition (LOI). Fly ash that has an LOI greater than about 1.5 is typically not suitable for use with concrete mixtures that have air entraining agents because the carbon destroys the air entrainment. The inventor of the present invention has found that the foam admixtures of the present invention that are stabilized with a fluorochemical surfactant are surprisingly resistant to destruction by high carbon fly ash. Thus, in one embodiment of the invention, the concrete mixture includes a fly ash having an LOI greater than about 1.5, more preferably greater than about 2, more preferably greater than 4, and most preferably greater than about 6. It has also been found that high carbon fly ash when used in combination with the fluorochemical stabilized foam admixtures of the present invention, increases the strength of the cured concrete over fly ash that is not high carbon.

G. Viscosity Modifiers

Viscosity modifying agents (VMA), also known as rheological modifiers or rheology modifying agents, can be added to the concrete mixture of the present invention. These additives are usually water-soluble polymers and function by increasing the apparent viscosity of the mix water. This enhanced viscosity facilitates uniform flow of the particles and reduces bleed, or free water formation, on the fresh paste surface.

Suitable viscosity modifiers that can be used in the present invention include, for example, cellulose ethers (e.g., hydroxyethyl cellulose (HEC), hydroxypropylmethyl cellulose (HPMC), sodium carboxymethyl cellulose (CMC), carboxymethylhydroxyethyl cellulose (CMHEC), and the like); synthetic polymers (e.g., polyacrylates, polyvinyl alcohol (PVA), polyethylene glycol (PEG), and the like); exopolysaccharides (also known as biopolymers, e.g., welan gum, xanthan, rhamsan, gellan, dextran, pullulan, curdlan, and the like); marine gums (e.g., algin, agar, carrageenan, and the like); plant exudates (e.g., locust bean, gum arabic, gum Karaya, tragacanth, Ghatti, and the like); seed gums (e.g., Guar, locust bean, okra, psyllium, mesquite, and the like); starch-based gums (e.g., ethers, esters, and related derivatized compounds). See, for example, Shandra, Satish and Ohama, Yoshihiko, "Polymers In Concrete", published by CRC press, Boca Ration, Ann Harbor, London, Tokyo (1994).

Viscosity modifying agents are typically used with water reducers in highly flowable mixtures to hold the mixture together. Viscosity modifiers can disperse and/or suspend components of the concrete thereby assisting in holding the concrete mixture together. This property of viscosity modifiers makes them useful for making self compacting concrete, which requires high flowability.

Some foam admixtures of the present invention (e.g. fluorochemical stabilized foams having nonionic and anionic monomers) can act as a viscosity modifying agent thereby reducing the need for a separate viscosity modifier in the concrete mix. Highly flowable and/or self-compacting concrete can be achieved with these foams of the present invention while substantially reducing the amount of viscosity modifier included separately in the concrete mix. In an exemplary embodiment, viscosity modifier is added to the concrete mix in an amount less than 12 oz/100 wt, more preferably less than 9 oz, even more preferably less than about 5 oz, and most preferably substantially no viscosity modifier is added apart from the foam admixture.

Even with no additional viscosity modifier added to the concrete mixture, the concrete mixtures of the present invention can be highly flowable. Water and Low-range, mid-range, and/or high range water reducers can be added to the concrete mixture to give the concrete mixture a high flowability without the concrete separating because the foam admixture acts as a very good viscosity modifier. Concrete according to the present invention can be manufactured to have a "flow spread" of greater than 24-36 inches (using a 12 inch slump cone). The high spread of the concrete composition of the present invention are particularly advantageous because the spread is homogenous. The foam admixtures of the present invention can suspend the aggregate and other components in the concrete mixture such that mixes that spread greater than about 24-36 inches are spread substantially homogenous.

H. Other Admixtures

Many other types of admixtures can be added to the concrete compositions of the present invention to give the concrete a desired property. As discussed below, other admixtures suitable for use in the concrete mixtures of the present invention include but are not limited to viscosity modifiers, corrosion inhibitors, pigments, wetting agents, water soluble polymers, strength enhancing agents, rheology modifying agents, water repellents, fibers, permeability reducers, pumping aids, fungicidal admixtures, germicidal admixtures, insecticidal admixtures, finely divided mineral admixtures, alkali reactivity reducer, bonding admixtures, and any other admixtures or additive that do not adversely affect the stabilized foam or hydration stabilizers of the present invention.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Permeability reducers are used to reduce the rate at which water under pressure is transmitted through concrete. Silica fume, fly ash, ground slag, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fibers can be distributed throughout a fresh concrete mixture to strengthen it. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present invention can include but is not limited to alkali metal sulfate, alkaline earth metal sulfates, alkaline earth oxides, preferably sodium sulfate and calcium oxide.

Alkali-reactivity reducers can reduce the alkali-aggregate reaction and limit the disruptive expansion forces in hardened concrete. Pozzolans (fly ash and silica fume), blast-furnace slag, salts of lithium, and barium are especially effective.

Bonding admixtures are usually added to hydraulic cement mixtures to increase the bond strength between old and new concrete and include organic materials such as rubber, polyvinyl chloride, polyvinyl acetate, acrylics, styrene butadiene copolymers, and other powdered polymers.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Air entrainers can be included in the concrete mixtures of the present invention, although this is usually not necessary since the foam admixtures provide an air entraining features. Unlike foam, air entrainers are added to the concrete mixture in a liquid form (i.e. without the air entrapped).

III. Methods of Making and Using Concrete Mixtures

The present invention also includes methods for making foam and methods for incorporating those foams into concrete mixtures.

A. Method of Making Foam Admixtures

As discussed above, in an exemplary embodiment, the foam admixtures are manufactured from a foam concentrate. Foam production is performed by drawing water and the foam concentrate, in proper ratios, and injecting them into a chamber using high pressure air. The mixture is subjected to shearing forces that produce air bubbles (i.e. foam) in the chamber.

The ratio of water, foam concentrate, and air are controlled to produce air bubbles of a desired size and shape. In a preferred embodiment, the water and foam concentrate are mixed to form a diluted concentrate comprising between at least about 80% water, more preferably greater than about 90% water and more preferably greater than about 95% water. The amount of air injected into the diluted foam is controlled by the air pressure and volume of air.

In an exemplary embodiment, air bubbles are formed having an approximate size of about 0.3 ml to about 1.0 ml, more preferably from about 0.5 ml to about 0.7 ml. In a preferred embodiment, the bubbles are of uniform size and shape. It is believed that the uniform size and shape is beneficial for providing a uniform dispersion of cement and aggregate.

Any number of foam production devices can be used for producing the foam admixtures of the present invention, and the invention is not limited to any specific such device. Such devices are well known in the art. Whatever mechanism used, it should be adequate to produce a stream of bubbles suitable for introduction into the concrete mixtures of the present invention.

The following formula "Concentrate I," shown in the table below, illustrates a suitable concentrate for manufacturing a foam admixture according to the present invention.

| CONCENTRATE I | | |
|---|---|---|
| COMPONENT | CAS NUMBER/TRADE NAME | w/w % |
| Sodium alkenyl sulfonates mixture) | 68439-57-6, 11066-21-0, 11067-19-9 | 7.0 |
| 1-t-Butoxy-2-propanol | 57018-52-7 | 5.0 |
| Rhamsan gum | 96949-21-2 | 2.0 |
| Perfluoroethylthia acrylic telomere | Lodyne ™ K90'90 (Ciba-Geigy Corp.) | 1.4 |
| n-Alkanols (mixture) | 112-53-8, 112-72-1, 36653-82-4 | 1.0 |
| 2-Methyl-2-propanol | 75-65-0 | 0.2 |
| Water | 7732-18-5 | balance |

Concentrate I can be used to form a stable and resilient aqueous foam admixture by diluting Concentrate 1 to 2.5 w/w % water (39 parts water to one part Concentrate I) and then aerating it through a foam generating chamber at about 92 psi, thereby subjecting the diluted Concentrate I to shearing forces that produce an aqueous foam admixture.

B. Method of Mixing Concrete

The concrete mixtures of the present invention are manufacture by mixing proper amounts of a hydraulic cement, hydration stabilizer, water, and foam admixture. Typically the concrete mixture also includes aggregate. However, for some non-structural applications, aggregate may not be necessary. Dispersants and other admixtures can be added as needed to give the concrete mixture desired properties.

Typically the hydraulic cement, hydration stabilizer, water, and foam can be mixed together in any order so long as the water is added before the foam. The hydration stabilizer is preferably added to the cement before the cement is mixed with the foam to minimize the reaction of hydraulic cement and foam. It has also been found that adding the hydration stabilizer to the water before the water is mixed with the cement can also increase stability of the foam when the foam is mixed with the cement. Accelerator can be added to the concrete mixture at the same time that the hydration retarding agent is added, or the accelerator can be added at a later point in time, such as just before the concrete is to be poured.

The amount of foam mixed into the concrete mixture is selected to give the concrete a desired percent of air. In an exemplary embodiment, the foam admixture is included in the concrete mixture in an amount sufficient to provide greater than 5% air in the concrete, more preferably greater than 10% air, and most preferably greater than about 15% air by volume of the concrete mixture.

The limit on the amount of foam that can be added depends on the desired final strength of the concrete and the amount of cement in the mixture. In general, lower percentages of air and higher amounts of cement produce stronger cements. However, the concrete mixtures of the present invention can have very high compressive strengths with percentages of air above 5%, as compared with existing cements. Using the aqueous foams of the present invention, air can be entrained into the concrete mixture in percentages greater than 5%, 10%, and even 20% while maintaining compressive strengths of greater than about 2500 psi, and more preferably greater than about 3000 psi, in 28 days. For example, concrete mixtures according to the present invention having 12% air and 300 lbs/yd$^3$ of cement can achieve about 3000-4000 psi in 28 days. In another example, concrete mixture according to the present invention having 22% air and 650 lbs/yd$^3$ cement can achieve a compressive strength of about 6500 psi in 28 days. Even at very high percentages of air, significant compressive strength can be achieved. For example, concrete mixtures of 85% air can achieve 90 psi in 28 days.

Because the cement is stabilized with respect to the foam using the hydration stabilizer, the air entrainment provided by the foam can last at least until the concrete sets.

Table 2 below provides 3 different exemplary ranges of typical amounts of the components needed to make concrete mixtures according to the present invention.

TABLE 2

|  | 1 | 2 | 3 |
|---|---|---|---|
| Portland Cement | 1-50% | 6-50% | 10-25% |
| Washed Sand | 0-75% | 0-60% | 0-40% |
| Coarse Aggregate | 0-60% | 0-50% | 0-40% |
| Water | 4-50% | 5-50% | 10-25% |
| Pozzolanic Material | 0-50% | 0-20% | 0-5.0% |
| Foam Admixture | 1-90% | 1-85% | 1-75% |
| Water Reducers | 0-20 oz | 0-6.0 oz | 0-4.5 oz |
| Accelerators | 0-20 oz | 0-12 oz | 0-8.0 oz |
| Hydration Stabilizer | 0.5-20 oz | 1.0-12 oz | 1.5-6.0 oz |

In the compositions described in Table 2, the foam admixture is manufactured as described above (e.g. Concentrate I diluted to 2.5 w/w % water and foamed at 92 psi). The weight of the foam admixture includes the weight of the water that makes up the foam. Water is also included as a separate component, which does not include the water in the aqueous foam admixture.

A sufficient amount of hydration stabilizer is included to stabilize the foam admixture for a desired amount of time. The sufficiency of the hydration stabilizer can depend in part on the type of concrete being made. For ready mixed concrete, where transportation is often needed, the hydration stabilizer can be added in greater amounts such that the stabilization lasts during transportation and until the concrete has set.

The amount of hydration stabilizer used in the concrete mixture is determined by the need to stabilize the cement with respect to the foam. A sufficient amount of hydration stabilizer will inhibit the reaction between the cement and the foam such that a majority or substantially all of the foam initially mixed into the concrete lasts until the concrete achieves initial set. Typically, less than 2% of the foam collapses within the first 2 hours.

Regardless of whether the concrete is designed to set in a short period (e.g. less than 1 hour) or over along period of time, the hydration stabilizer included in the concrete of the present invention can be very beneficial to stabilizing the foam admixture. The cement in a concrete mixture is most reactive, and thus most destructive to the foam admixture, when it is first mixed with the water. Consequently, the hydration stabilizer provides its greatest benefit during initial mixing of the cement, foam, and water, although significant benefits can still be realized by including the hydration stabilizer after initial mixing. The use of hydration stabilizer during the initial mixing of the concrete differs from most current practices, which add hydration stabilizer to waste concrete after a job is finished or during a job to preserve the concrete for later use. In the present invention, the hydration stabilizer is added to prevent the reaction of the foam and the cement. Accelerators can be added anytime during or after mixing to control set time, if needed.

Those skilled in the art will recognize that there are many applications in which the combination of hydration stabilizer, hydraulic cement, and foam according to the present invention can be easily incorporated into a concrete composition using the foregoing description. The following examples give specific formulations of aqueous foams and concrete composition that employ the concepts of the present invention.

IV. Examples

Examples 1-5 illustrate concrete compositions according to the present invention. In each formula, admixtures (e.g. water reducers WR) were added based on 100 lbs of cement (i.e. 100-wt cement). The concrete mixtures of Examples 1-3 had 12% air and produced cured concrete with a compressive strength of greater than 3000 psi at 28 days.

Example 1

| COMPONENTS | AMOUNTS |
|---|---|
| Portland Cement | 308 lbs/yd$^3$ |
| Water | 30 gal/yd$^3$ |
| Hydration Stabilizer (Recover, W. R. Grace) | 5.5 oz/100-wt |
| Fine Aggregate | 1630 lbs/yd$^3$ |
| Coarse Aggregate | 1235 lbs/yd$^3$ |
| Foam Admixture (Miracon) | 2.8 ft$^3$/yd$^3$ |
| Mid Range WR (997, Master Builders) | 5 oz/100-wt |
| Low Range WR (27, W. R. Grace) | 0.5 oz/100-wt |

Example 2

| COMPONENTS | AMOUNTS |
|---|---|
| Portland Cement | 308 lbs/yd$^3$ |
| Water | 30 gal/yd$^3$ |
| Hydration Stabilizer (Recover, W. R. Grace) | 5.5 oz/100-wt |
| Fine Aggregate | 1630 lbs/yd$^3$ |
| Coarse Aggregate | 1235 lbs/yd$^3$ |
| Foam Admixture (Miracon) | 2.8 ft$^3$/yd$^3$ |
| High Range WR (Adva, W. R. Grace) | 3.5 oz/100-wt |
| Low Range WR (27, W. R. Grace) | 0.5 oz/100-wt |

Example 3

| COMPONENTS | AMOUNTS |
|---|---|
| Portland Cement | 308 lbs/yd$^3$ |
| Water | 30 gal/yd$^3$ |
| Hydration Stabilizer (Recover, W. R. Grace) | 5.5 oz/100-wt |
| Fine Aggregate | 1630 lbs/yd$^3$ |
| Coarse Aggregate | 1235 lbs/yd$^3$ |
| Foam Admixture (Miracon) | 2.8 ft$^3$/yd$^3$ |
| High Range WR (Adva, W. R. Grace) | 3 oz/100-wt |
| Mid Range WR (997, Master Builders) | 6.5 oz/100-wt |
| Low Range WR (27, W. R. Grace) | 0.5 oz/100-wt |

Example 4

| COMPONENTS | AMOUNTS |
| --- | --- |
| Holcim Cement | 408.2 lbs/yd$^3$ |
| Water | 25.88 gal/yd$^3$ |
| Hydration Stabilizer (Delvo, Master Builders) | 2.52 oz/100-wt |
| Fine Aggregate (concrete sand) | 1251 lbs/yd$^3$ |
| Coarse Aggregate (#8 pea gravel) | 830.8 lbs/yd$^3$ |
| Fly Ash (Bridger) | 164.1 lbs/yd$^3$ |
| Foam Admixture (Miracon) | 7.65 ft$^3$/yd$^3$ |
| High Range WR (30/30, Master Builders) | 6.3 oz/100-wt |
| Low Range WR (27, W. R. Grace) | 1.17 oz/100-wt |
| Accelerator Calcium Chloride | 32.32 oz/100-wt |

The concrete prepared using Example 4 had 27.1% air and a compressive strength of 923 psi in 28 days and 1205 psi in 56 days.

Example 5

| COMPONENTS | AMOUNTS |
| --- | --- |
| Cement (Ashgrove I/II) | 352 lbs/yd$^3$ |
| Water | 21.8 gal/yd$^3$ |
| Hydration Stabilizer (Recover,) | 1.99 oz/100-wt |
| Fine Aggregate (concrete sand) | 1316 lbs/yd$^3$ |
| Coarse Aggregate (#8 pea gravel) | 312 lbs/yd$^3$ |
| Coarse Aggregate (#57 rock) | 1581 lbs/yd$^3$ |
| Fly Ash (San Juan Type F) | 103 lbs/yd$^3$ |
| Foam Admixture (Miracon) | 1.5 ft$^3$/yd$^3$ |
| High Range WR (30/30, Master Builders) | 4.85 oz/100-wt |
| Low Range WR (27, W. R. Grace) | 2.5 oz/100-wt |
| Accelerator Calcium | 29.82 oz/100-wt |

The concrete prepared using Example 5 had 5.8% air and a compressive strength of 3615 psi in 28 days and 4320 psi in 56 days.

Example 6

In Example 6, a concrete mixture was prepared using a standard air entraining agent and a second mixture was prepared using Miracon as an air entraining agent. Both had an air entrainment of 5.8%, a density of 139 lbs/ft$^3$ and used 5.5 sacks of cement. The following performance data compares the performance of the standard mixture and the mixture prepared according to the present invention.

|  |  | Standard Air Entrainment | Air Entrainment with Miracon |
| --- | --- | --- | --- |
| Bleeding, (%) |  | 1.68% | 1.11% |
| Initial Set (hr) |  | 4.67 | 4.51 |
| Compressive Strength (psi) | 3 day | 2130 | 2840 |
|  | 7 day | 2890 | 3610 |
|  | 21 day | 4110 | 4970 |
| Flexural Strength (psi) | 3 day | 430 | 470 |
|  | 7 day | 490 | 610 |
|  | 21 day | 590 | 640 |

As can be seen from the comparison with standard air entrainment, concrete entrained using the hydration stabilizer and foams of the present invention achieve higher strength and decreased bleeding when compared with traditional air entraining agents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A concrete mixture, comprising:
   (i) a hydraulic cement;
   (ii) a hydration stabilizer comprising one or more calcium chelating agents;
   (iii) water; and
   (iv) a foam admixture comprising water and a fluorochemical surfactant, wherein the foam is stabilized in the presence of the hydraulic cement by the hydration stabilizer.

2. A concrete mixture as in claim 1, wherein the calcium chelating agent comprises a molecule selected from the group consisting of N-nitrilo tris(methylene phosphonic acid), 1,2-ethanediyl bis[nitrilo di(methylene phosphonic acid)]; 1,6-hexanediyl bis[nitrilo di(methylene phosphonic acid)], amino tris(methylene phosphonic acid), polymethoxy polyphosphonic acids, and combinations thereof.

3. A concrete mixture as in claim 1, wherein the foam admixture comprises at least about 5% by volume of the concrete mixture.

4. A concrete mixture as in claim 1, wherein the foam admixture comprises at least about 10% by volume of the concrete mixture.

5. A concrete mixture as in claim 1, wherein the hydration stabilizer is included in an amount sufficient to inhibit the reaction between the hydraulic cement and the water in the foam for greater than about 30 minutes.

6. A concrete mixture as in claim 1, wherein the hydration stabilizer is included in an amount sufficient to inhibit the reaction between the hydraulic cement and the water in the foam for greater than about 1 hour.

7. A cured concrete manufactured by pouring the concrete mixture of claim 1 and allowing the concrete mixture to cure.

8. A concrete mixture as in claim 1 that achieves a compressive strength of greater than 2500 psi in 28 days, when allowed to set.

9. A concrete mixture as in claim 1 that achieves a compressive strength of greater than 3000 psi in 28 days, when allowed to set.

10. A method for manufacturing an initial concrete mixture having stable air entrainment, comprising:
    (i) preparing a foam admixture by mixing together a foam concentrate comprising a fluorochemical surfactant, water, and air under shear forces sufficient to form a plurality of air bubbles;
    (ii) providing a hydration stabilizing including a calcium chelating agent; and
    (iii) forming an initial concrete mixture by mixing together the foam admixture, a hydraulic cement, water, aggregate, and the hydration stabilizer, wherein the hydration stabilizer inhibits the destruction of the air bubbles by the hydraulic cement during at least a portion of the initial mixing.

11. A method as in claim 10, wherein the calcium chelating agent comprises a molecule selected from the group consisting of N-nitrilo tris(methylene phosphonic acid), 1,2-ethanediyl bis[nitrilo di(methylene phosphonic acid)]; 1,6-hexanediyl bis[nitrilo di(methylene phosphonic acid)], amino tris(methylene phosphonic acid), polymethoxy polyphosphonic acids, and combinations thereof.

12. A method as in claim 10, wherein the foam admixture comprises at least about 5% by volume of the concrete mixture.

13. A method as in claim 10, wherein the hydration stabilizer is included in an amount sufficient to inhibit the reaction between the hydraulic cement and the water in the foam for greater than about 30 minutes.

14. A method for making a concrete structure comprising pouring the concrete mixture of claim 10 into a form and allowing the concrete mixture to cure.

15. A method as in claim 14, wherein the cured concrete achieves a compressive strength of greater than 2500 psi in 28 days.

16. A method as in claim 10, further comprising the step of mixing a fly ash with the cementitious material, the fly ash having a loss on ignition of at least about 6%.

17. A method for manufacturing an initial concrete mixture having stable air entrainment, comprising:
(i) providing a firefighting foam concentrate;
(ii) preparing a foam admixture by mixing together the firefighting foam concentrate, water, and air under shear forces sufficient to form a plurality of air bubbles;
(ii) providing a hydration stabilizer including a calcium chelating agent; and
(iii) forming an initial concrete mixture by mixing together the foam admixture, a hydraulic cement, water, aggregrate, and the hydration stabilizer, wherein the hydration stabilizer inhibits the destruction of the air bubbles by the hydraulic cement during at least a portion of the initial mixing.

18. A method as in claim 17, wherein the firefighting foam concentrate is a aqueous film forming foam, a protein foam, a fluoroprotein foam, an alcohol resistant fluoroprotein foam, a film forming fluoroprotein, and/or an alcohol-resistant film forming fluoroprotein (AR-FFFP).

19. A method as in claim 18, wherein the calcium chelating agent comprises a molecule selected from the group consisting of N-nitrilo tris(methylene phosphonic acid), 1,2-ethanediyl bis[nitrilo di(methylene phosphonic acid)]; 1,6-hexanediyl bis[nitrilo di(methylene phosphonic acid)], amino tris(methylene phosphonic acid), polymethoxy polyphosphonic acids, and combinations thereof.

20. A method for making a concrete structure comprising pouring the concrete mixture of claim 18 into a form and allowing the concrete mixture to cure, wherein the cured concrete achieves a compressive strength of greater than 3000 psi in 28 days.

* * * * *